United States Patent [19]

Dean

[11] 4,232,776

[45] Nov. 11, 1980

[54] ACCELERATING WALKWAY

[75] Inventor: George A. Dean, Kansas City, Mo.

[73] Assignee: Dean Research Corporation, Kansas City, Mo.

[21] Appl. No.: 867,111

[22] Filed: Jan. 5, 1978

[51] Int. Cl.$^3$ .............................................. B65G 13/07

[52] U.S. Cl. .................................... 198/322; 198/324; 198/334; 198/337; 198/791

[58] Field of Search ................................ 198/321-323, 198/324, 334, 783, 784, 790, 335, 337, 789, 791

[56] References Cited

U.S. PATENT DOCUMENTS

| | | | |
|---|---|---|---|
| 1,114,621 | 10/1914 | Lewis | 198/415 |
| 1,908,528 | 5/1933 | Milner | 198/789 |
| 2,769,522 | 11/1956 | Pfeiffer | 198/334 |
| 2,905,100 | 9/1959 | Kendall et al. | 198/784 |
| 3,518,944 | 7/1970 | Patin | 198/334 |
| 3,601,246 | 8/1971 | Dubois | 198/334 |
| 3,665,863 | 5/1972 | Patin | 198/334 |
| 3,858,870 | 1/1975 | Yabe et al. | 198/791 X |

*Primary Examiner*—Jeffrey V. Nase
*Attorney, Agent, or Firm*—Bierman & Bierman

[57] ABSTRACT

A variable speed walkway system capable of receiving passengers, accelerating them to above walking speed conveying them over a selected distance at a constant speed, and decelerating them for comfortable exiting is provided. In the preferred form, the system comprises a plurality of rollers driven by a prime mover through individual polyurethane belts to obtain acceleration and deceleration. In a second preferred form, the system comprises a variable speed drive employing one or more belts each of which drives a plurality of rollers. All rollers driven by a single belt accelerate or decelerate in unison. Acceleration and deceleration in this second embodiment is preferably computer controlled. A handrail which accelerates and decelerates with the walkway is provided for both embodiments.

11 Claims, 18 Drawing Figures

TURNSTILE CONTROL
GATE CONTROL
COMPUTER
ACCELERATION SECTION
HIGH SPEED SECTION
DECELERATION SECTION
RED
GREEN
X
Y
148
150
151
152
153
154
158
159
160
161
162
164
210

ACCELERATING WALKWAY

This invention relates to conveyers and, in particular, to "people movers" of the type which can accelerate to move people and baggage from point to point at speeds higher than walking speed.

Moving walkways were first developed in the eighteenth century. These early devices were constant speed walkways and since that time, walkway development has for the most part been limited to improving their cost and reliability.

Experimentation over the years has shown that constant speed moving walkways cannot be safely operated at speeds greater than about 2.05 miles per hour, the speed at which one can safely enter and exit from the walkway. As this speed is about one half walking speed, most people prefer to avoid the constant speed walkway unless they happen to be carrying heavy packages or luggage.

It is desirable to employ moving walkways in areas or regions of large concentrations of people provided the walkway can operate at speeds in excess of normal walking speed. Such high speed walkways can replace the automobile for short distance travel and can relieve congestion and bring order to crowded terminals, all at lower pollution levels and at greater convenience to the public.

High speed walkways are subject to the same 2.05 mph entry/exit speed limit. In order to move passengers at a higher speed, the walkway must accelerate to the selected speed, then decelerate at the terminals to allow passengers to exit as no more than 2.05 mph.

Previous design efforts have concentrated on rather sophisticated and expensive solutions typically employing modified escalator components. One of the two available prototypes of which I am aware employs escalator comb-like plates while the other provides plates which slide with respect to one another along a curved path resembling a stretched out S. Both systems are complex requiring expensive parts, consume large amounts of power and would require major excavation work or building renovation if they are to be used. Additionally, the ratio of top speed to entry speed is generally limited to about five to one. Given typical entry speeds of 1.5 mph, the top speed would then be about 7.5 mph. Finally, neither of these prototype systems appears to employ a handrail capable of accelerating with the walkway, a feature most desirable from the standpoint of the passenger.

In accordance with the present invention, a variable speed walkway is provided containing a first section for passenger entry, an acceleration section, a high speed section and a deceleration section.

The acceleration and deceleration sections are of primary importance. The acceleration section accelerates a passenger from the entry speed to the high conveyance speed. The deceleration section simply reverses the process. The acceleration and deceleration sections may be structurally the same and it is preferable to employ this approach as it is less expensive. For purposes of description, from this point on, the structure of the acceleration and deceleration sections will be presumed to be the same.

In one preferred embodiment of the invention, the acceleration and deceleration sections comprise a plurality of bearing supported rollers. The rollers extend substantially transverse to the direction of passenger movement. Each roller is provided with a sheave driven by a prime mover.

The prime mover may be an electric motor or it may be a motor powered by hydraulic pressure or air. In either case, the output shaft of the prime mover is provided with one or more sheaves connected by polyurethane drive belts to one or more drive shafts. The drive shafts are, in turn, connected to the sheaves of the individual rollers.

To obtain acceleration, the output speed of the prime mover may be kept constant and the pitch diameter of the roller driving and driven sheaves varied to obtain a different surface velocity for each roller. The change in speed between adjacent rollers is the acceleration (or deceleration) which the passenger experiences.

A plurality of prime movers is normally employed, each driving a plurality of rollers. As a specific example, a single 8 pole AC induction motor of approximately ½ h.p. can be used to drive approximately 24 rollers having a diameter of 1.00 inches and a useable treadway surface of about twenty five inches (and with a roller length of about forty inches).

The walkway surface in prior art moving walkway systems employing escalator components or combed plates must be returned to the starting point. The machinery necessary to achieve this is generally quite sizable, taking up substantial space and frequently requiring excavation or major building modification where the return is beneath the walkway surface.

Employing rollers as with the present invention avoids the problem of walkway return. System size is minimal and major building modification and excavation is avoided. In addition, the constant speed sections and the acceleration and deceleration sections can be built as modular units which are easy to make, ship and install. They are also easy to service. These advantages are not generally found in the prior art units.

The use of polyurethane belts is particularly advantageous. Unlike V-belts which need idler rollers and continuous adjustment, the polyurethane belts do not permanently stretch, need no adjustment yet can absorb shock.

As a further benefit, the use of polyurethane belts driven through low horsepower prime movers provides safety not generally found in existing moving walkway designs. With a ½ h.p. motor driving 24 rollers, the horsepower available at any one roller is small and not sufficient to cause physical harm to a passenger who, by accident, manages to fall or to catch clothing between rollers. Should this unlikely event occur, the belts will immediately begin to slip, or the motor will stop as the reaction torque exceeds its capacity. This is in contrast to escalators and other moving walkways serviced by high horsepower motors and chain drives which produce enough power to maim and frequently kill unlucky passengers who get clothing or fingers caught in the operating mechanism.

In a second embodiment of the invention, passengers enter upon an initially stationary section of the walkway. When a selected number of passengers have entered, the rollers are driven at increasing speeds to accelerate the passengers to the selected speed of the walkway. At the end of the walkway, the rollers are decelerated to approximately 2.05 mph by reversing the process employed in the acceleration zone.

The rollers in their section are driven by one or more belts connected to one or more prime movers, preferably hydraulic. Belts are used, but they need not be polyurethane belts—timing belts serving the purpose in this embodiment—since differential speed control from roller to roller is not employed.

For best results, a computer is employed to automatically control all walkway functions when employing the structure of the second embodiment. Briefly, passengers are permitted to enter the stationary section. After a selected number of passengers have entered, or after a preselected time lapse, the computer signals to activate means for preventing further passenger boarding. The computer then signals the prime movers which then begin to accelerate the rollers to design conveyance speed, typically between 7.5 and 10 mph.

The passengers are then moved onto the high speed conveyance section and, as the last passenger enters this section, sensing means signal the computer which in turn operates to return the acceleration section to rest, ready to accept the next load of passengers.

At the deceleration end, sensing means sense the arrival of the first passenger and this fact is signaled to the computer. The time between passenger entry to the high speed section and arrival at the deceleration section is measured and compared to a preselected elapsed time. If the actual elapsed time is shorter than the preselected time, the sensing circuits "know" that the first passenger has walked forward during transit and that the group is spread out. The computer then signals the prime movers to reduce the speed of the entire walkway—acceleration section, high speed section and deceleration section—to the maximum exit speed of 2.05 mph, thus permitting the rear passengers to enter the deceleration section and be moved to the walkway termination point at an acceptable speed. For best results, to allow the walkway to discharge exiting passengers safely and to resume high speed operation, additional passengers will be refused entry until all passengers then on the walkway have been discharged.

Accelerating walkways must contend with the problem of "bunching", a situation which may be troublesome for the passenger.

Assume two passengers, one behind the other, are spaced comfortably apart on the entrance section of the walkway. When acceleration begins, the space between these two passengers will increase. As a corollary, the deceleration zone will decrease the spacing between these passengers to the same spacing that existed at the point of entry, assuming that the passengers have not walked forward during their ride.

However, it is possible for the passenger located to the rear to walk forward, thus reducing the distance between himself and the forward passenger. When this occurs, the two passengers would be crowded uncomfortably against each other in the deceleration section.

The system described as the second embodiment accelerates and decelerates all embarked passengers equally and entirely eliminates the problem of bunching.

Moving walkways, like escalators, require the use of handrails for the passengers. Constant speed walkways employ constant speed continuous handrails. But accelerating walkways require accelerating handrails and the design of a handrail which can accelerate and decelerate with the walkway surface has proven difficult to develop.

In accordance with another aspect of the present invention, a handrail system capable of accelerating and decelerating with the walkway is also provided. The handrail in one embodiment, preferably comprises a plurality of blocks which rest on rollers. The rollers comprise the drive system which may be operated by the same prime movers employed to drive the walkway rollers, or by one or more separate prime movers. The rollers frictionally engage the blocks and, for best results, the block is made to rest on at least two rollers at any time.

After a handrail block has traveled from entrance to exit, it is returned to the entrance point. The return path is preferably one which carries the handrail block under the handrail and then parallel to the ground until the block reaches the entrance point of the walkway. The path is then upwardly to return the handrail block to its normal position above the walkway surface.

If desired, the curved return path for the handrail blocks may be horizontal instead of vertical. However, the vertical return is more desirable as less space is required.

For the second embodiment, in which all rollers in a particular section rotate at the same speed, one may employ a conventional escalator or constant speed walkway handrail.

Referring now to the drawings wherein like numerals refer to like parts:

Figures 5A, 5B, 5C, 5D, 5E:
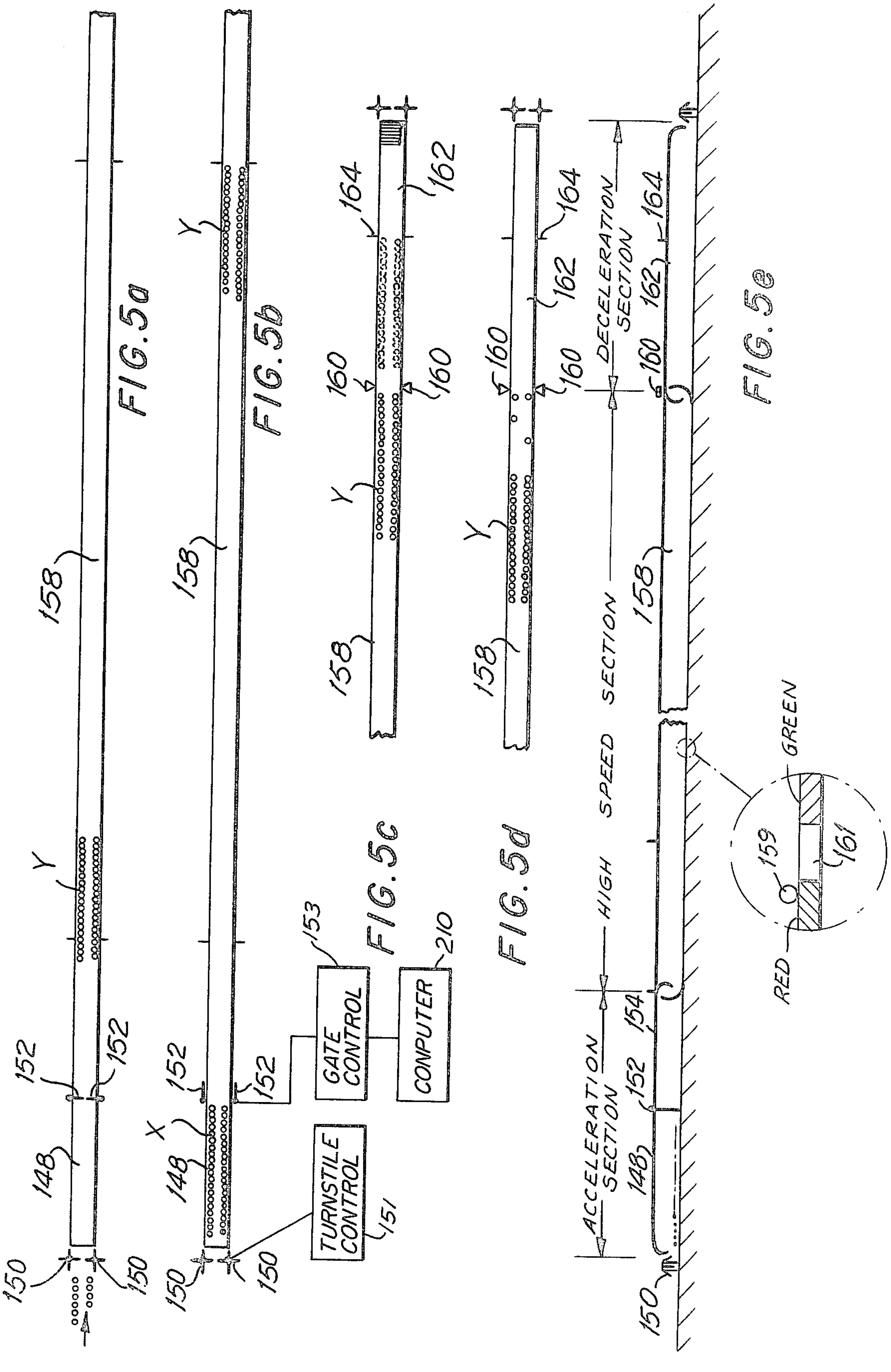
Figure 6:
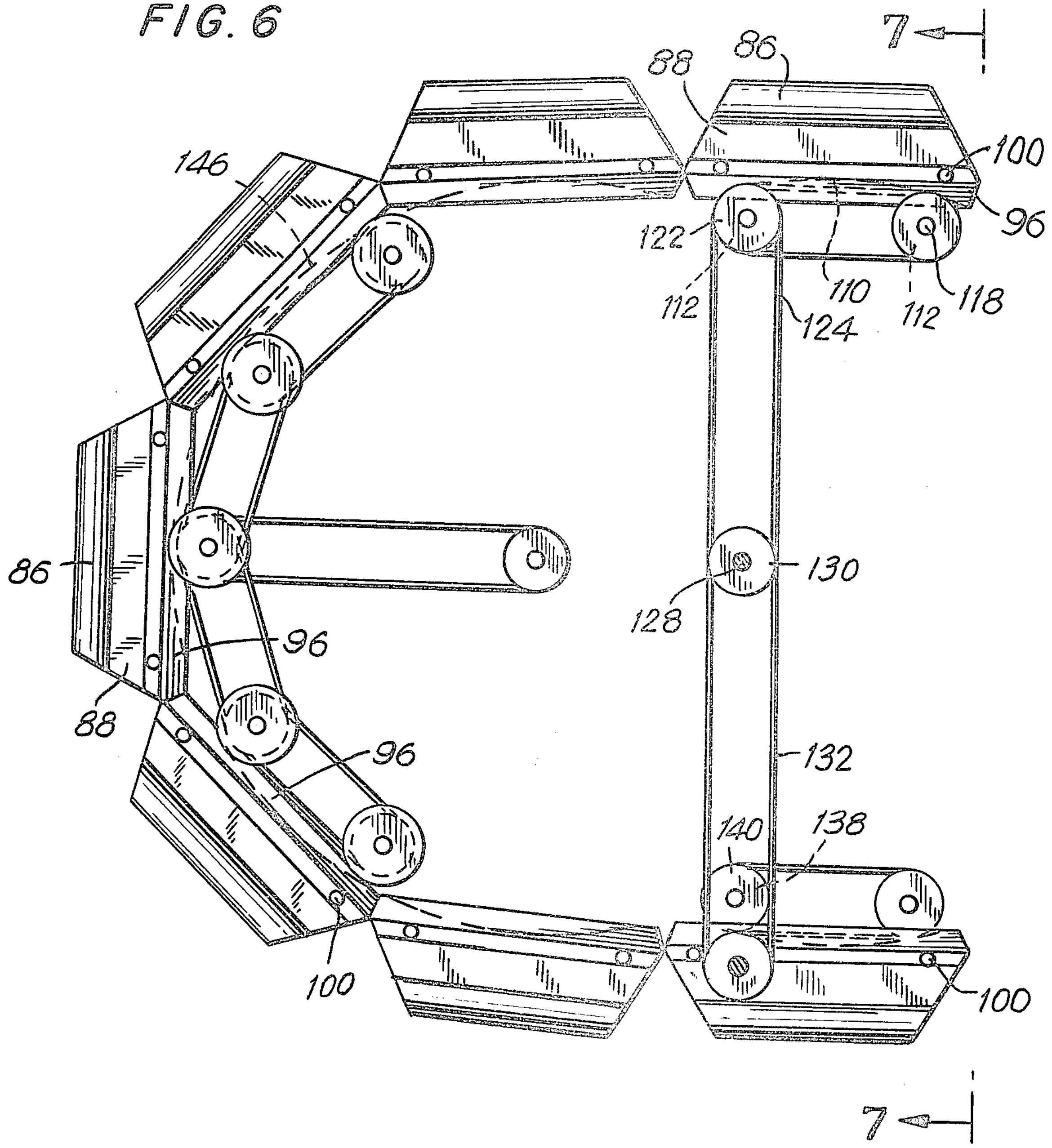
Figure 7:
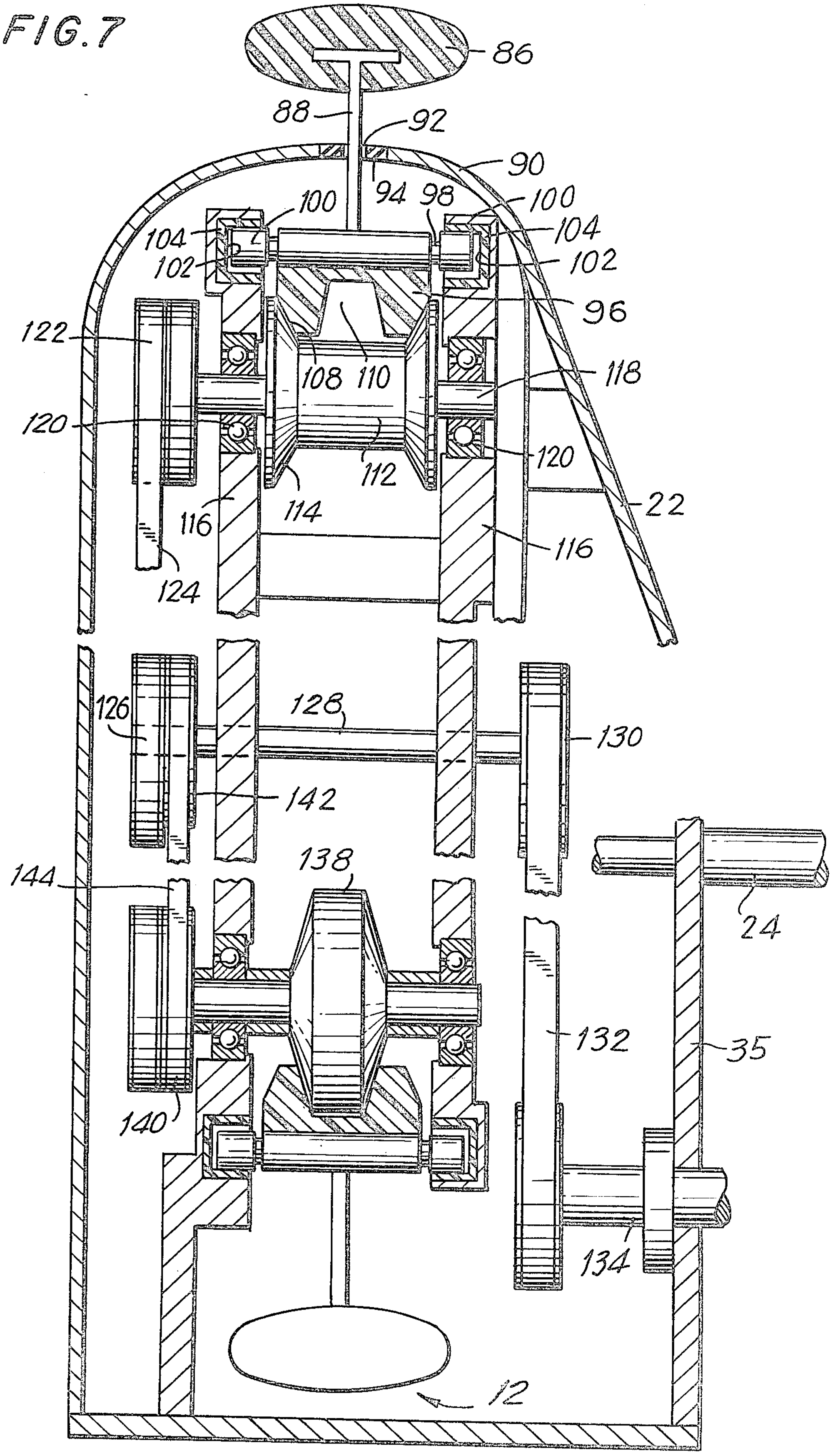
Figure 8:
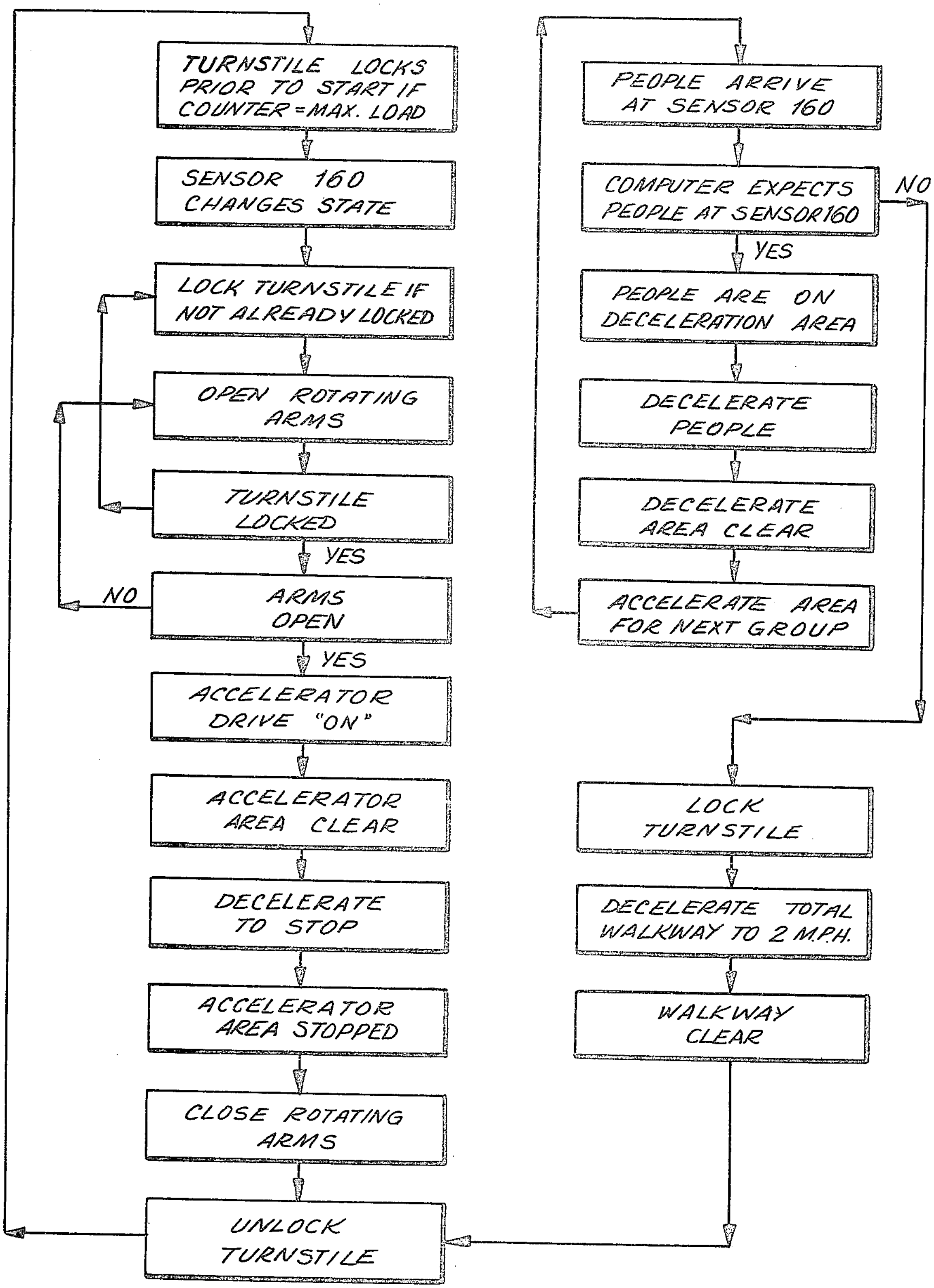

FIG. 5*a* through 5*e* are schematic drawings illustrating the movement of passengers along a variable speed walkway in accordance with a second embodiment of the invention;

FIG. 6 is a side plan view of a portion of a variable speed handrail in accordance with the present invention;

FIG. 7 is a front view of the variable speed handrail taken along line 7—7 in FIG. 6; and FIG. 8 is a flow diagram of a computer system for controlling the walkway of FIGS. 5*a*—*5e*.

Figure 9A:
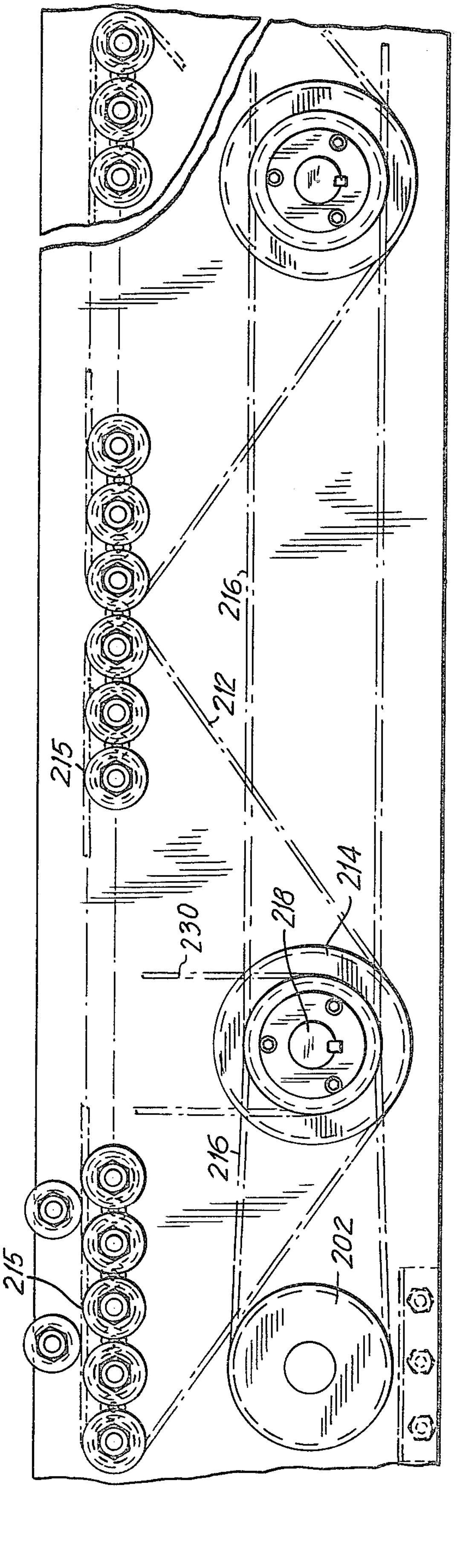
Figure 11:
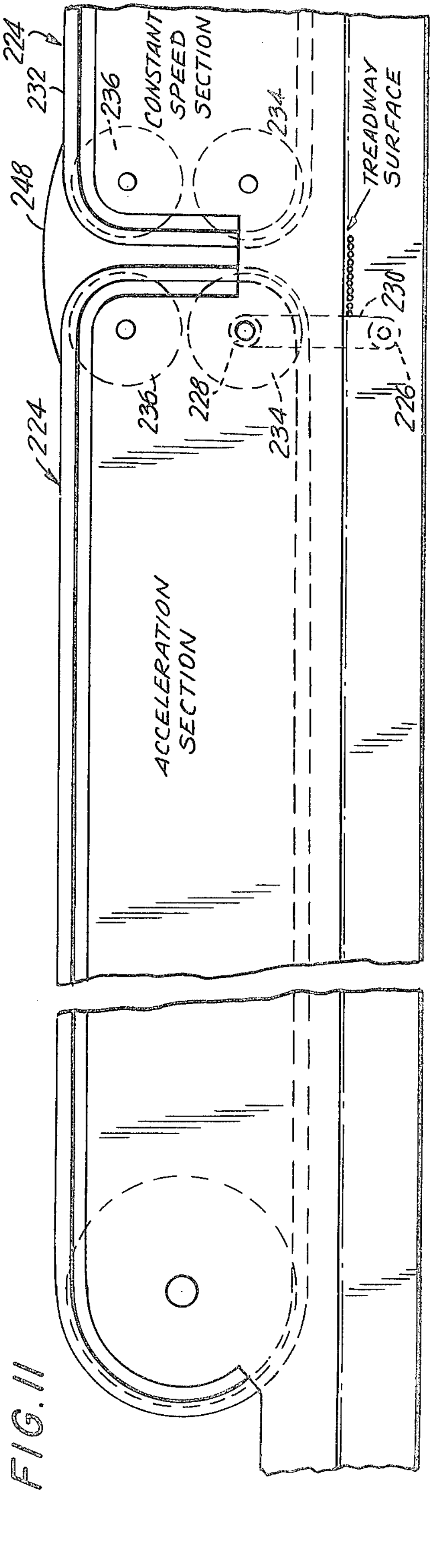
Figure 9C:
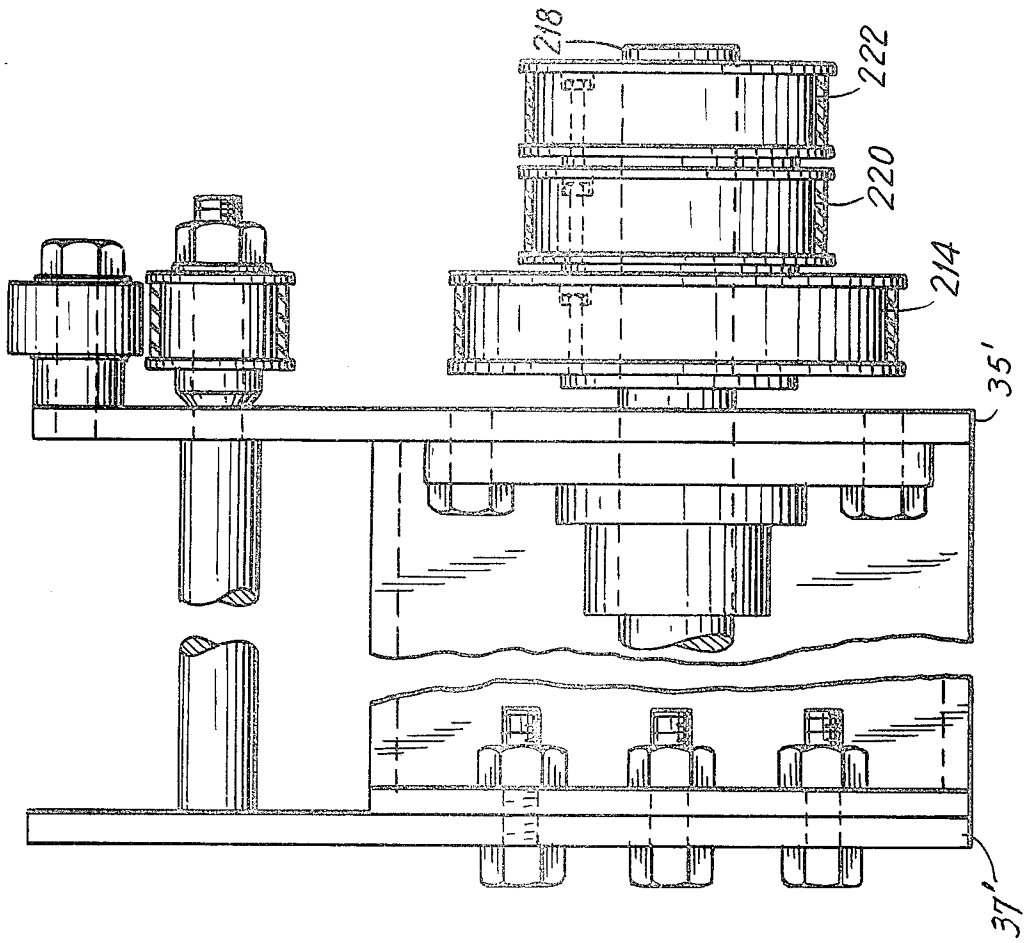
Figure 9B:
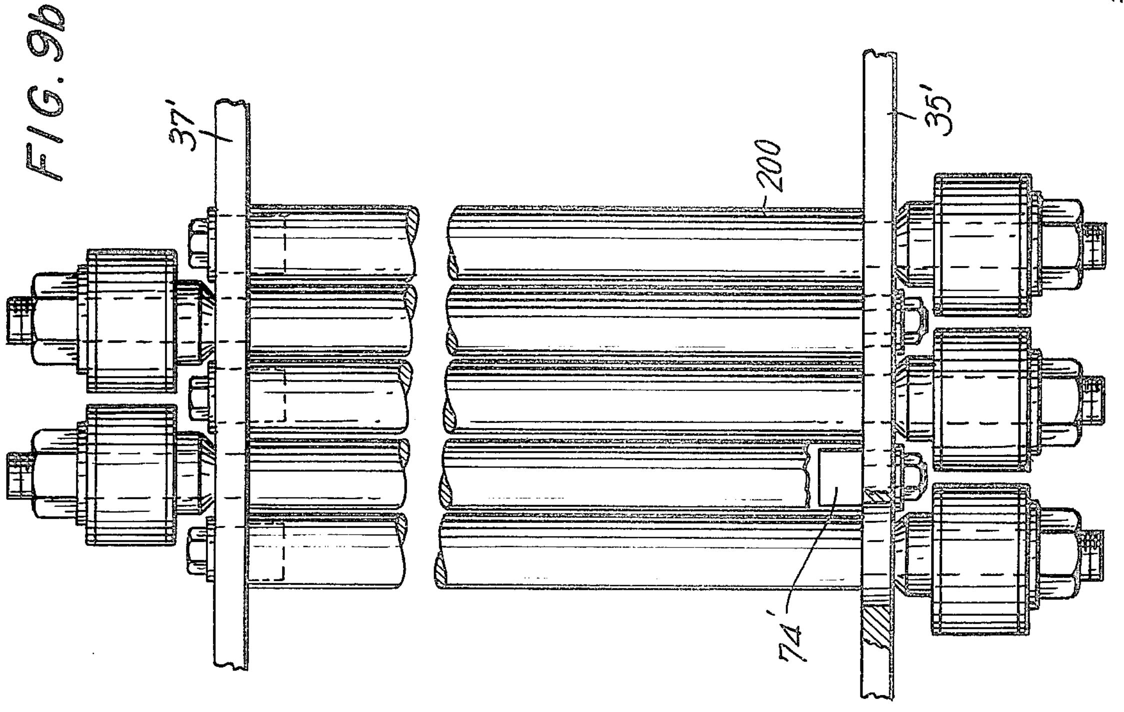
Figure 10:
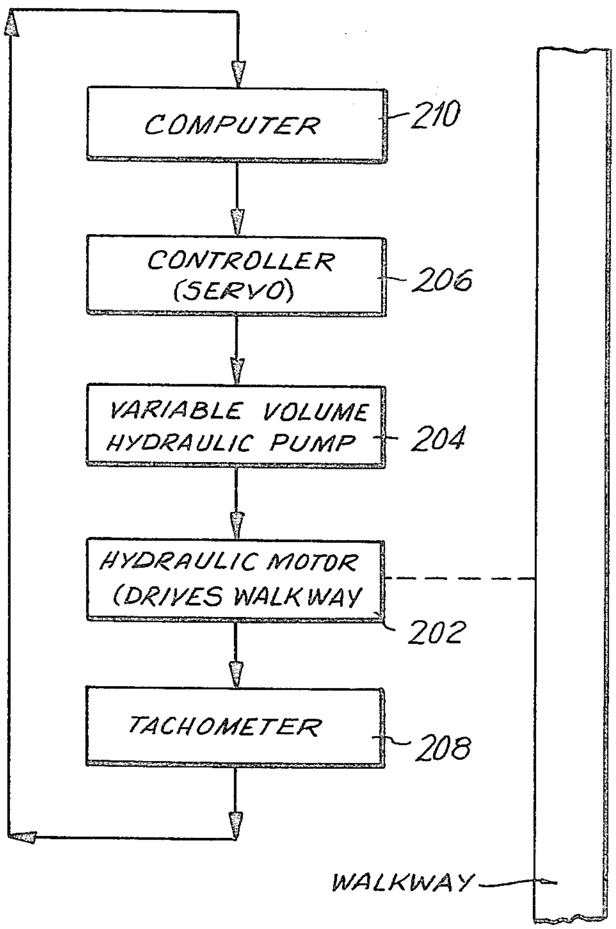
Figure 12:
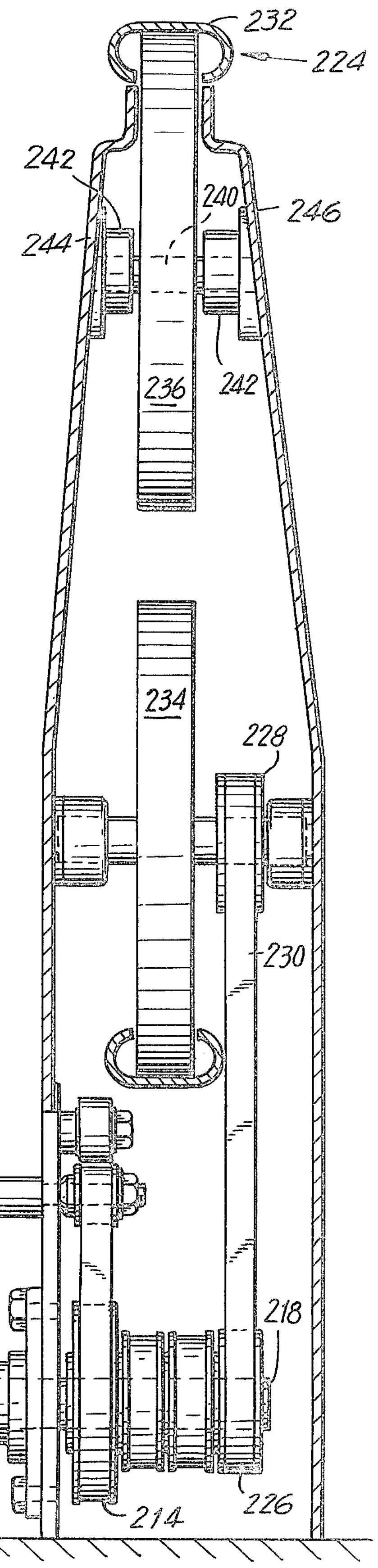

FIGS. 9(*a*) through 9(*c*) illustrate a walkway in accordance with another embodiment of the invention;

FIG. 10 is a flow diagram of the manner in which the computer controls walkway speed in the second embodiment;

FIG. 11 is a plan view, in section, of an accelerating handrail system employed in conjunction with the walkway shown in FIG. 9(*a*); and FIG. 12 is a side view of the handrail of FIG. 10.

Figure 1:
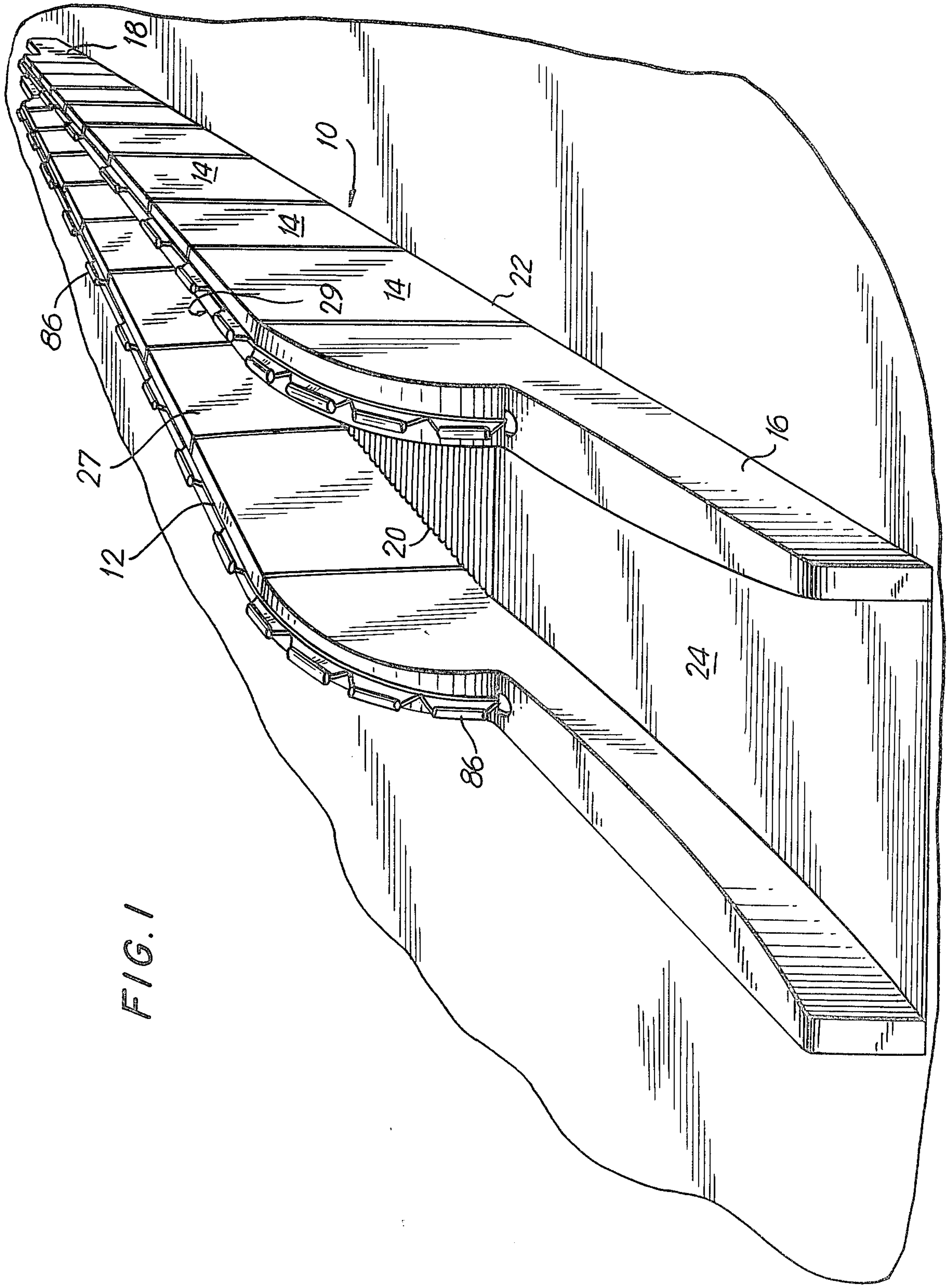
FIG. 1 is anisometric plan view of a modular variable speed walkway system.

Referring now to FIG. 1, the numeral 10 denotes the variable speed walkway system.

As shown, the system is comprised of a plurality of individual modules 14 with two end modules denoted by the numerals 16 and 18. Each module is self-contained and comprises walkway rollers 20, side encasements 22 for enclosing the operating mechanism, and a handrail 12.

A major advantage of the variable speed walkway system of the present invention lies in its compactness, permitting the inclusion of all operating components in modular units. Each module is built and assembled at the factory and then shipped to its final destination. The system is completed by simply placing module after module, as shown in FIG. 1, until the desired walkway length is obtained.

Another advantage of the modular approach is the ability to include "stations" or breaks in the system allowing people to pass through the system at selected points. One can therefore build a series of crossing units to handle multi-directional traffic in congested areas, a feature not generally obtainable with prior art units.

As will become apparent later in this description, modules intended to provide acceleration may be made readily interchangeable with each other. Additionally, each acceleration module may be employed as a deceleration module. In other words, the acceleration and deceleration modules may be made interchangeable. Also, modules intended to occupy the constant speed section of the walkway are interchangeable with each other.

Module interchangability, an advantage of the present invention, may be dispensed with if desired, as may the modules. In their place, one may employ a fixed system built to order without departing from the spirit of the invention.

As shown, the end modules 16 and 18 employ rubber tread 24 extending over a substantial portion of the length of the module (the tread for end module 18 is not shown). Tread 24 is stationary and serves as an entrance (and exit) surface for passengers using the walkway.

Following tread 24 is a plurality of rollers generally designated by the numeral 20. A first group of rollers (denoted by numeral 25 in FIG. 2) is driven by a prime mover at different surface velocities in order to accelerate the passenger to a preselected speed in excess of normal walking speed (the acceleration section). For most purposes, a speed of 7.5 mph is adequate and safe. There is no limitation on speed with the present system, the only limitations on top speed being the life of the bearings employed to support rollers 20 within the high speed section of the system and the comfort of the passengers.

Figure 2:
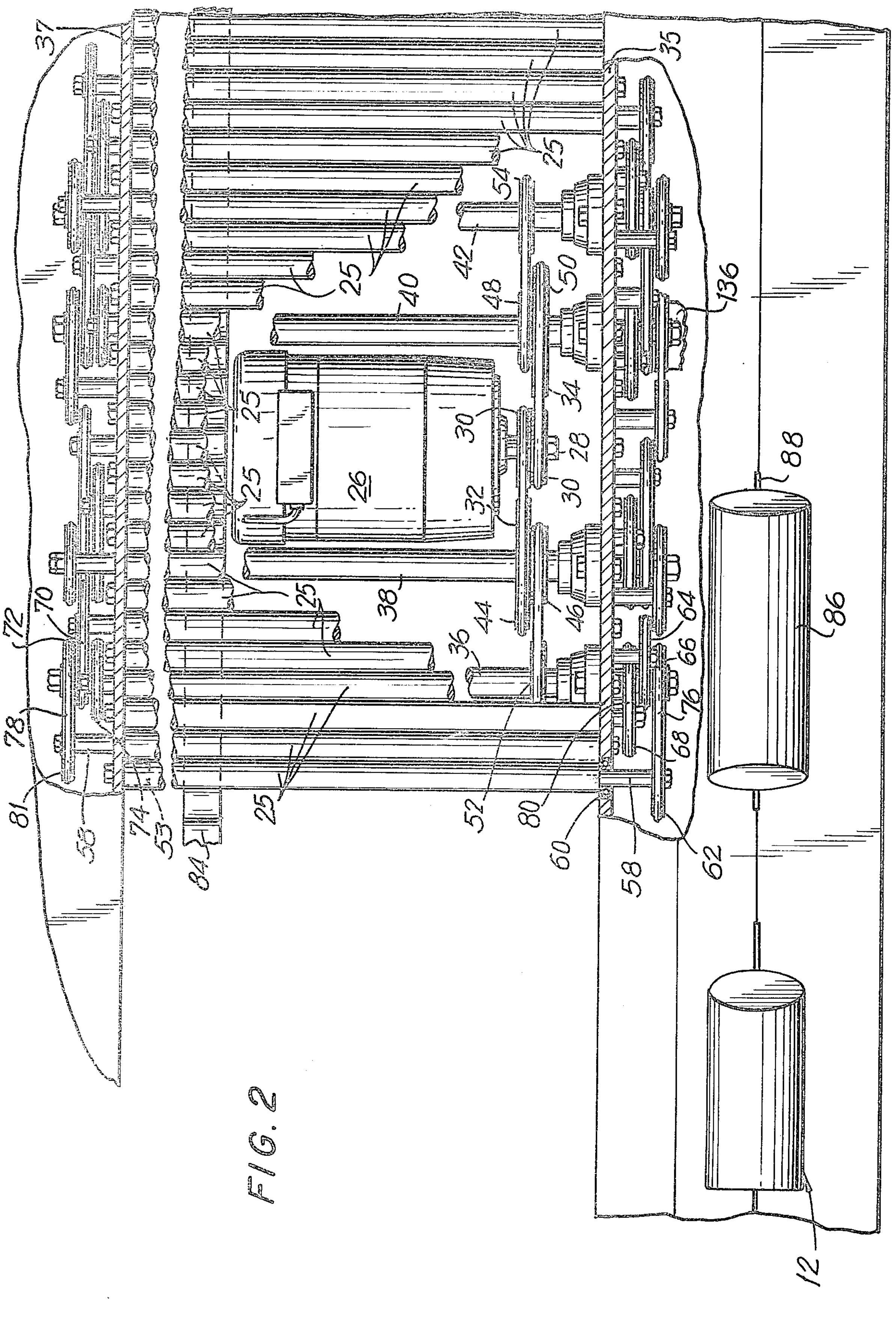
FIG. 2 is a top plan view of the variable speed walkway.
Figure 3:
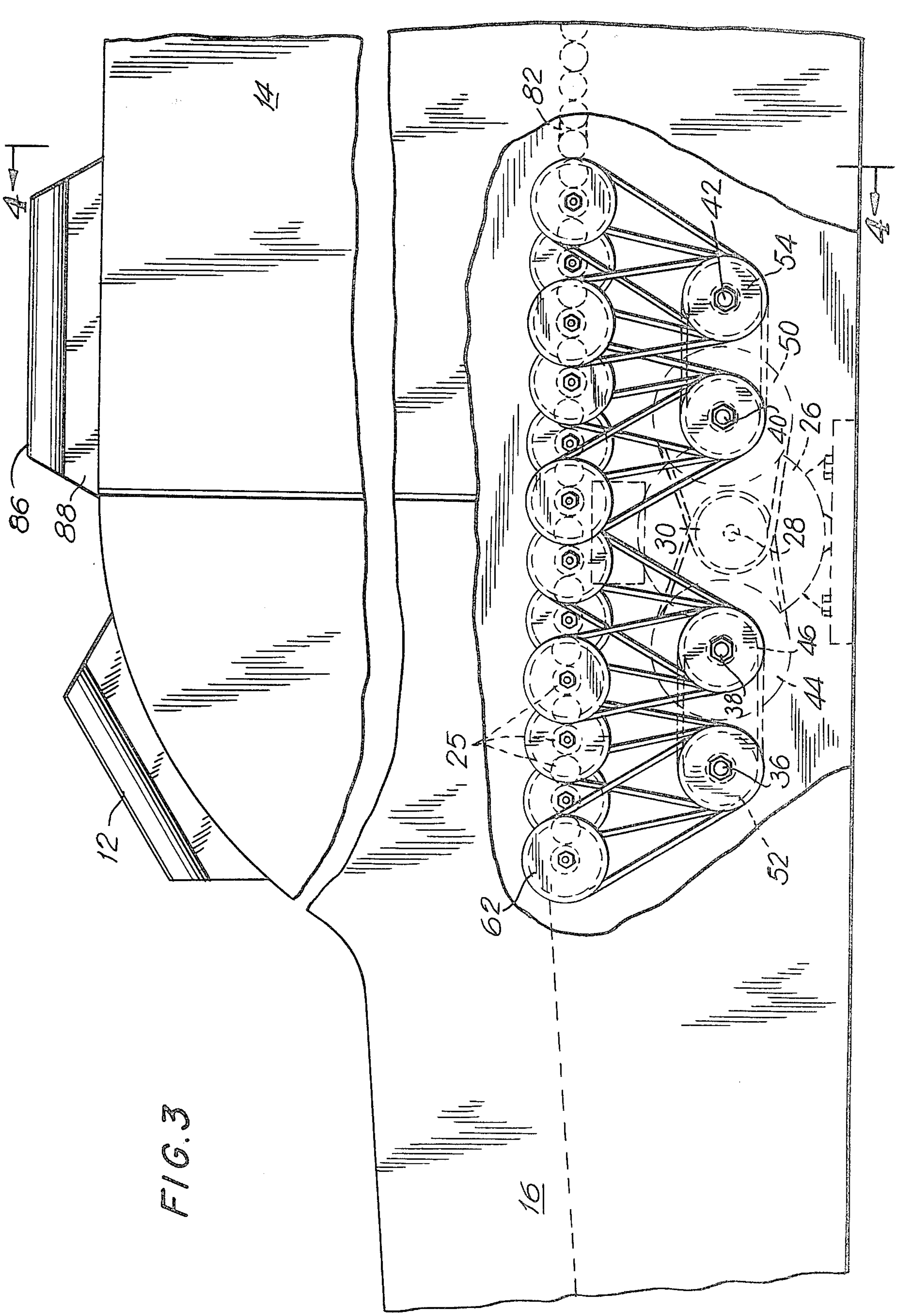
FIG. 3 is a side view of the walkway of FIG. 2.

Referring to FIG. 2, an electric AC induction motor 26 is positioned under the rollers. Motor output shaft 28 has a pair of sheaves 30 thereon which carry polyurethane belts 32, 34 thereon. The sheaves are grooved to accept the polyurethane belt, as seen more clearly in FIG. 3.

Parallel support rails 35, 37 are provided. The support rails are spaced apart approximately the width of the walkway, typically somewhat in excess of forty inches. The supports serve to mount rotatable shafts 36, 38, 40, 42, each of which is used to drive six rollers. For ease of reference, the groups of twenty-four rollers driven by motor 26 are all designated by the numeral 25.

Shafts 38 and 40 each have two sheaves 44, 46 and 48, 50, respectively, thereon. Shafts 36 and 42 each have but a single sheave denoted by the numerals 52, 54, respectively. All four shafts are driven by the output shaft of motor 26 through polyurethane belts, as shown.

Rollers 25 are journaled in support rails 35, 37. As shown in FIG. 2, the first roller is journaled in support rail 37 via a removable bearing 53 sold under the trademark CAMROL. The other end of the roller is provided with an extension 58 which rests in a conventional bearing 60. Mounted on the end of extension 58 is a sheave 62.

The next roller is the same as the first roller except that the CAMROL bearing (not shown) is mounted in support rail 35 and the extension 58 is mounted in a conventional bearing (not shown) in support rail 37. In short, the second of the rollers is the same as the first, only mounted in reverse. This alternating method for mounting the rollers is preferably followed throughout the entire variable speed walkway system.

Each of the shafts 36, 38, 40, 42 has three sheaves mounted on each end. Taking shaft 36 as exemplary, sheaves 64, 66, 68 are mounted on the end of the shaft adjacent support rail 35 and sheaves 70, 72, 74 are mounted on the end of the shaft adjacent support rail 37.

Shaft 36 drives six rollers. Sheave 66 drives the first roller through polyurethane belt 76. Sheave 72 (adjacent support rail 37) drives the second roller through polyurethane belt 78, sheave 68 drives the third roller (adjacent support rail 35) through polyurethane belt 80, sheave 74 drives the fourth roller, sheave 64 drives the fifth roller and sheave 70 drives the sixth roller. Driving alternate rolls from opposite sides balances the torque on the drive shaft and promotes longer motor and bearing life.

Acceleration is obtain by varying the pitch diameter of the roller sheaves. With the motor output shaft running at constant speed the surface velocity of each roller is determined by the ratio of the pitch diameter of the roller sheave to the pitch diameter of the sheave on the motor output shaft. Decreasing the pitch diameter of the roller sheave increase the surface velocity of the attached roller; while increasing the pitch diameter of the roller sheaves decreases the surface velocity of the attached roller.

In the embodiment shown (FIG. 2) the pitch diameters of the roller sheaves decrease incrementally from left to right. The sheave pitch decrease between any two adjacent rollers (such as between sheaves 62 and 81) is set according to the acceleration rate desired.

As with shaft 36, each of shafts 38, 40 and 42 have six rollers, the total number of rollers being driven by the motor 26 being twenty-four. In a typical installation, motor 26 will be an AC induction motor whose output is about ½ h.p., the power level best suited for driving twenty-four follers in a typical walkway system employing forty-inch long rollers (as measured from support rail to support rail). The number of rollers that can be driven from a single motor can be increased or decreased simply by changing to a motor with a higher or lower power output rating, as desired.

A module may consist of as little as one motor with its associated rollers, or a plurality of such motors and roller groups.

The foregoing description relates to an acceleration module. Deceleration modules are built exactly the same except that the pitch diameter of the roller sheaves increases in the direction of deceleration in order to decrease the surface velocity of the rollers as the passenger approaches the exit point. To employ an acceleration module for deceleration, the module is placed in the system so that the roller sheaves increase in pitch diameter in the direction of passenger movement. The motor output shaft direction of rotation is also reversed. No further description of the apparatus pertaining to deceleration is deemed necessary but it should be understood that the deceleration modules can be made to decelerate passengers either more quickly or more slowly by simply changing roller or motor output sheave pitch diameters.

Figure 4:
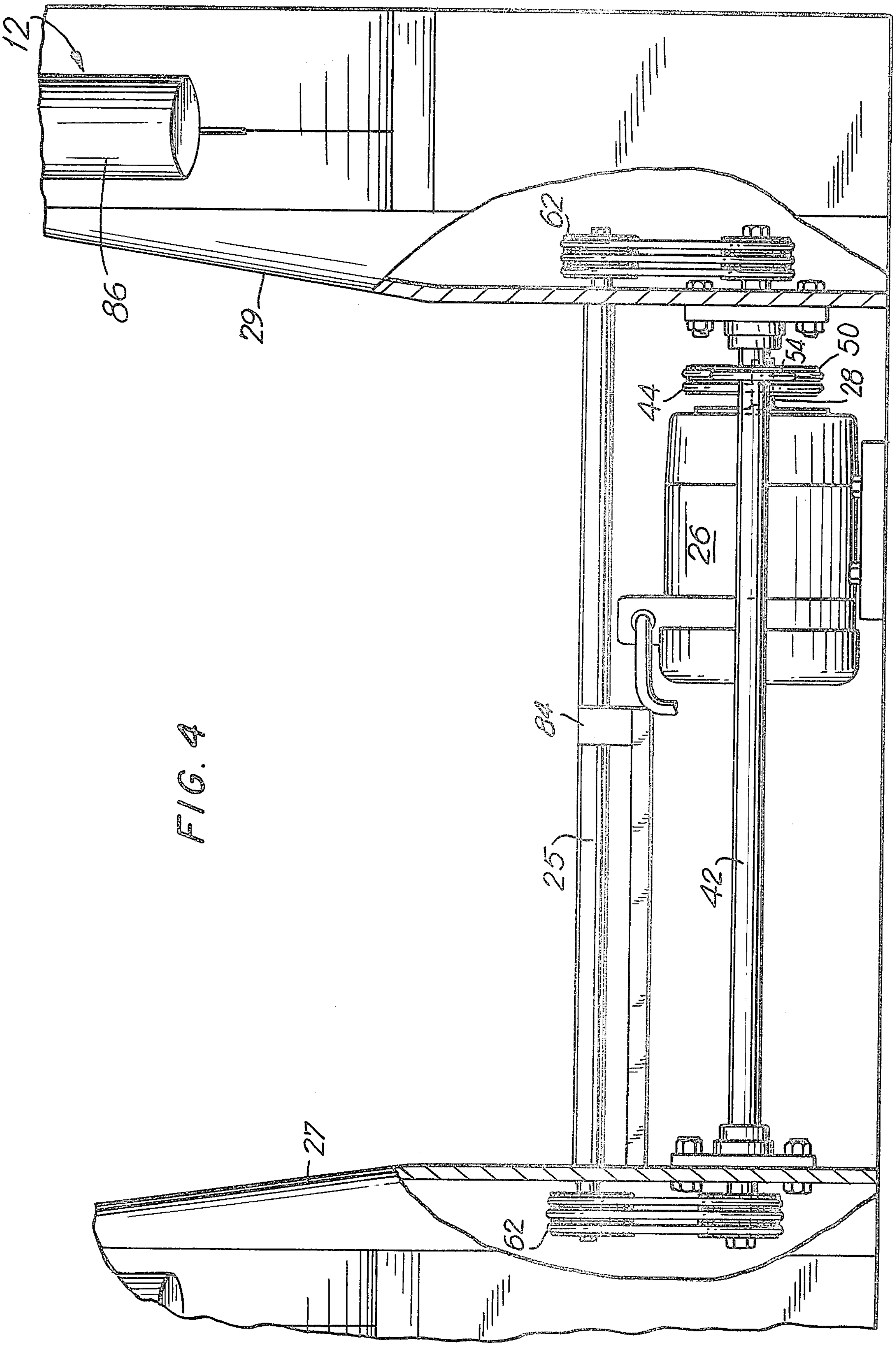
FIG. 4 is a front view of the walkway taken along line 4—4 in FIG. 3.

The high speed conveyance section bridges the distance between acceleration and deceleration sections. The precise components described above can be employed in the high speed section. However, since constant speed is desired, the pitch diameter of the sheaves is constant and does not vary throughout the entire length of the high speed section. For purposes of illustration, FIGS. 2, 3 and 4 serve to illustrate the mechanical components of all these sections.

If desired, the space between rollers 20 may be filled by inserting a plastic insert 82 (FIG. 3) made of a low friction plastic such as nylon. The insert is mounted to the side rails by screws or other conventional means (not shown).

Moving walkways generally employ a treadway width of approximately forty inches. This width has been sufficient to carry two people side by side and is considered adequate. With a forty-inch useable width, rollers 20 generally need not be supported beyond the support provided by side rails 35 and 37. If desired, a central bearing 84 (FIG. 2) can be provided and should be provided in designs where the walkway width significantly exceed forty inches. Bearing 84 may be a simple low friction-high wear conventional plastic rail installed beneath the roller surface as indicated by the dotted lines in FIG. 2.

The side encasements 22 are each provided with inner walls 27, 29 from the handrail to just above the roller surface. The roller extends beyond the edge of the inner walls 27, 29 to the side rails. With this arrangement, it is difficult and most unlikely that articles of clothing or soft shoes can be caught as is frequently the case with escalators when the soft shoe will extrude between the wall and escalator surface, frequently injuring the passenger.

A variable speed walkway system should also be provided with a handrail whose instantaneous speed at any point substantially matches the speed of the adjacent walkway.

The accelerating handrail comprises a plurality of blocks generally denoted by the numeral 12 and best seen in FIGS. 6 and 7. The blocks comprise an elliptical unit 86 which the passenger may hold for support. A T-section 88, preferably made of metal, is embedded in the elliptical unit and extends downwardly through a cover 90 to the operating mechanism below. Cover 90 is slit along its entire length at 92. A plastic closure or cap 94 is placed in the slit 92. The plastic closure extends the length of the slit and normally closes the slit until it is forced open by T-section 88 as the handrail moves.

Each T-section 88 is mounted in a friction block 96. A shaft 98 is rotatably mounted in each friction block. Camrol bearings 100 are mounted on the ends of shaft 98 and ride in slots 102 which in turn are faced with conventional bushing material 104. Slots 102 are formed in side walls 106 which extend the length of the walkway and are within side encasements 22.

Friction block 96 is provided with tapered exterior walls 108 and a V-shaped groove 110. The drive for the friction blocks comprises a spool 112 haing tapered side walls 114 for frictionally engaging the tapered side walls 108 located on the friction block.

Spool 112 is mounted in supports 116 via shaft 118 and conventional bearings 120. Mounted on shaft 118 is a pulley or sheave 122 which carries a polyurethane belt 124. A second sheave 126 is mounted on lower shaft 128 for reasons to be given below.

Belt 124 is mounted on sheave 126 which is in turn mounted on shaft 128. Shaft 128 is rotatably mounted in supports 116 by conventional means, as described for shaft 118, and extends horizontally toward the walkway surface. A further sheave 130 is mounted on shaft 128 and is connected via polyurethane belt 132 to a shaft 134. Shaft 134 is connected to the prime mover closest thereto either directly or via a polyurethane belt in the same manner as are the roller operating shafts 36, 38, 40 or 42 as shown in FIG. 2. Alternatively, the drive may be taken from each shaft driven by the motor simply by adding an extra sheave to each of shafts 36, 38, 40 and 42 as indicated in dotted lines and denoted by the numeral 136 in FIG. 2.

Alternatively, separate prime movers may be employed to drive the handrail, if it is not desired to take the power directly from the prime mover driving the treadway rollers.

Elliptical handrail units 86, in side view (FIG. 6), have a truncated shape and contact each other only at the bottom thus preventing passengers from accidentally having their hands caught between units.

As shown in FIG. 6, the handrail units are in abutting relationship at the entrance to the walkway. As each unit reaches a spool 112, it begins to accelerate and in general keeps pace with increasing walkway speed as the handrail unit moves to the right as viewed in FIG. 6. Spacing between handrail units 86 increses in the acceleration section and continues to increase until the handrail units reach the high speed section over which spacing will remain constant (see FIG. 1). In the deceleration section, spacing decreases until the handrail units have reached the exit speed of the walkway, or have contacted each other. In the event the handrail units contact each other too early, the handrail units will either slip on the spool or the polyurethane drive belts will slip to permit the handrail units to reposition themselves without damaging or in any way harming the drive mechanism.

During acceleration, best results are obtained if each handrail unit is in contact with two spools 112 at any one time. If each spool is driven at a different speed, some slip will occur and the handrail unit will move at the instantaneous average speed between the two spools.

The drive for the handrail units in the high speed section may be the same as described above for the acceleration section or a simple chain and sprocket drive may be employed if desired. The deceleration section is the same as the acceleration section. Drive spools are provided, each being driven at a lower speed as the passengers traverse the deceleration section.

As in the situation with the walkway rollers, acceleration and deceleration is obtained by varying the pitch diameter of adjacent drive sheaves. As a plurality of sheaves are employed to transfer power from the prime mover to the spools, one may pick and choose the sheave in the chain whose pitch diameter is to be varied.

The return path of the handrail units carries the units downwardly and below the surface of the walkway. The return path is horizontal. There is no need for the handrail units to accelerate or decelerate along the return path. It is sufficient to provide a few drive rollers, such as the trapezoidally shaped roller 138, which engage the groove 110 of the friction belts.

As shown in FIG. 7, the drive for roller 138 is obtained via sheaves 140 and 142 mounted and connected to each other through polyurethane belt 144. Idler rollers (not shown) are provided between drive rollers to support the handrail units so they return to the walkway entrancepoint. It can be readily appreciated that only a few drive rollers are needed in the return path to provide the necessary force to push the handrail units along the return pathway.

At the walkway entrance point, the handrail units follow a curved path 146 upwardly and into position to again move along the walkway as described above (see FIG. 6). The curved path comprises slot 102 (FIG. 7) in which Camrol bearings 100 ride. For best results, the trapezoidal rollers 138 are employed to move the handrail units along the curved path 146.

FIGS. 5*a* through 5*e* are a schematic representation of the walkway employing the same components shown in FIGS. 1 through 4 and 6 but operated somewhat differently.

This series of drawing figures depicts a computer controlled walkway and operates as follows:

A group of passengers, here denoted by the numeral 148, enter the walkway through conventional one-way turnstiles 150. Conventional counters are used to count the number of people entering or, in the alternative, people are given a certain amount of time in which to enter. After a selected number of people have entered or a selected time period has elasped, the turnstiles 150 automatically lock and prevent others from boarding through the action of turnstile control 151.

The walkway adjacent the turnstiles is initially at a standstill, a condition which extends along the acceleration portion of walkway 154 to rotating arms 152. As the passengers board, rotating arms 152 are locked in the position shown in FIG. 5(*a*) to retain passengers in position between turnstiles 150 and rotatable arms 152.

When loading is complete and passengers ready for accelerating to the high speed section, the turnstiles lock. A sensor 159 which may be a conventional photoelectrical sensor, is located adjacent the handrail return in the high speed section 158 [(See FIG. 5(*e*)]. The handrail is red in color, followed by a metallic insert, followed by a green colored section. The insert 161 is sensed by sensor 159 which then signals the computer 210 to act upon suitable switch means indicated as gate control 153 to open rotating arms 152, as illustrated in FIG. 5(*b*). The computer switches on the prime movers in the acceleration section, immediately beginning the process of accelerating the passengers to the selected high speed.

Sensor 159 is located such that the green section of the handrail in the high speed section will be presented to the first passenger, with the red section just in front. The color red is typically employed to signal danger and is used herein for the purpose of dissuading the leading passenger from walking forward while the passenger is in the high speed section. Additionally, the surface texture of the "red" section may be roughened so as to be uncomfortable to the touch, again tending to prevent the lead passenger from walking forward, for reasons to be more fully explained herein below.

Instead of a sensor and red and green sections, one may employ a blinking red light, or recorded voice to warn the passenger not to walk forward. Of course, warnings of any type may be dispensed with if desired.

As soon as the last passenger has cleared the acceleration section, the arms close and the drive to the acceleration section is shut down, thereby returning the acceleration section to rest, ready to accept the next group of passengers. The entire sequence of operations for the acceleration section is clearly illustrated in FIG. 8.

The acceleration section is shown schematically in FIG. 5(*e*) and denoted by the numerals 148 and 154.

Unlike the first embodiment, the rollers in the acceleration section shown in FIGS. 9(*a*)–(*c*) accelerate and decelerate as a group. The roller in this second embodiment are denoted by the numeral 200. They are precisely the same in construction as rollers 25, and are mounted to side rails 35', 37' in precisely the same manner, employing Camrol bearings 74' and conventional bearings as described in connection with the first embodiment.

For best results, a conventional hydraulic motor 202 is used as the prime mover, such as the RSA series motor made by WSI. Coupled to the motor is an hydraulic pump and a servo controller, conventional items employed in controlling hydraulic motors. As an example, the servo controller may be a MOOG unit mounted on a conventional Sundstrand pump which in turn is connected to the motor. A flow diagram of the foregoing is shown in FIG. 10 where the numeral 202. denotes a conventional hydraulic motor, the numeral 204 denotes a conventional hydraulic pump, the numeral 206 denotes a conventional servo controller, the numeral 208 denotes a tachometer used to measure motor speed (such as the Stal Gard Mach II solid state monitor made by Ward Industries); and numeral 210 denotes a conventional computer preprogrammed to supply the selected input signals to operate the motor 202 and its control attachments.

In this embodiment, polyurethane belts need not be used since the rollers in the acceleration section all accelerate at the same time. Timing belts 212 are employed and, in the embodiment shown, are each used to drive a set of twenty-six rollers, thirteen of which are driven from one side (frame 35') and thirteen of which are driven from the other side of the walkway (frame 37'). As is shown in FIG. 9(*a*), thirteen, or every other roller comprising the first set of twenty-six rollers, is driven by timing belt 212 via pulleys 214 and 215. Pulley 214 is in turn driven by motor 202 via conventional timing belt 216.

Pulley 214 is keyed to rotatable shaft 218. Shaft 218 extends across the walkway and has another pulley keyed to it at the opposite end (not shown). A timing belt (not shown) is mounted on this second pulley and to the roller pulleys (not shown) of the remaining thirteen rollers of the set. Thus, the drive for each set of twenty-six pulleys is equally applied from both sides of the walkway. Of course, the drive may be supplied entirely from one side if this is deemed desirable.

More or less than thirteen rollers may be driven by a single timing belt, as desired, although it is deemed best to limit the number of rollers driven by a single belt.

As shown in FIG. 9(*a*), a single motor 202 is employed to drive a plurality of pulleys in series through the use of a plurality of timing belts 216. Many sets of rollers can be driven from one motor, the number of such sets being limited only by the power output capacity of the motor.

The pulley arrangement for transferring driving power from one pulley to the next subsequent is shown in FIG. 9(*a*), where pulley 220, keyed to shaft 218 is associated with timing belt 216.

Acceleration is obtained by pumping fluid to hydraulic motor 202 in controlled but increasing amounts. All rollers associated with a particular motor then accelerate at the same speed, accelerating the group of passengers from zero miles per hour to the design conveyance speed, preferably about 7.5 mph.

FIG. 10 schematically illustrates the control sequence. Tachometer 208 measures motor shaft speed and this data is fed to computer 210 where it is compared with a preprogrammed acceleration curve. The computer in turn signals servo control 206 to increase or decrease the output of pump 204 which in turn controls the speed of motor 202 and hence the speed of the walkway. Each motor is separately connected to the computer and is separately controllable to help insure the same output speed of all motors in the acceleration section.

High speed section 158 in this embodiment is precisely the same as the high speed section described above in connection with the first embodiment and employs rollers driven either through pulleys, in sets, as described above for the acceleration section, or a chain and sprocket drive. No additional description is deemed necessary.

The passengers pass sensor 160 as they near the end of the high speed conveyance section 158. The sensor may be a simple photoelectric device whose output is connected to the computer (not shown). The computer measures the time in transit of the first passenger between rotating arms 152 and the sensor 160. Assuming the passengers have remained together as a group with little or no change in spacing between them, the sensor will sense the presence of the first passengers at a selected point in time. The passengers will then continue to move as a group onto the deceleration section 162, which, at the time of passenger entry, is operating at the same speed as the high speed conveyance section.

A sensor 164, preferably photoelectric, is located in the deceleration section 162. When the first passenger reaches sensor 164, the computer begins the process of deceleration until the entire deceleration section reaches exit speed. Exit speed may be set as high as 2.05 mph.

In the event, the passengers walk forward during their trip along the high speed conveyance section, the first passenger will be detected by sensor 160 earlier than if the passenger had not walked forward. This indicates to the computer that the passengers are no longer "grouped" but have stretched out. The computer will then slow down the entire system—acceleration section, high speed section and deceleration section—to 2.05 mph. Additionally, the turnstiles 150 will automatically lock to prevent a fresh group of passengers from entering until the "problem" group has left the walkway and the walkway is in condition to resume normal operation. This sequence of events is illustrated in the block diagram of FIG. 8. Since deceleration will begin from a lower speed, less distance is needed to achieve deceleration to exit speed. The effect is similar to the movement of sensor 164 toward the right.

Once the entering group of passengers has been moved to the high speed section and the acceleration section made ready for the next group, turnstiles 150 activate to allow boarding. When boarding is complete, rotating arms 152 are again opened to allow the next group through onto the high speed section. FIGS. 5(*a*) and 8 schematically illustrate this condition. Group Y, the first group to enter, has been accelerated onto the high speed section and turnstiles 150 are locked preventing passenger entry. Rotating arms 152 are also locked.

FIG. 5(*b*) shows group Y at a point well along the high speed section and the acceleration section accepting the next group of passengers, here denoted by the letter X. The X group is ready to begin acceleration onto the high speed section.

FIG. 5(*c*) illustrates the arrival of Group Y at sensor 160 in proper formation. The dotted line position illustrates the arrival of the group at sensor 164 after which deceleration begins. It should be noted that under ideal conditions, the deceleration of Group Y will not affect the high speed travel of the following group X.

FIG. 5(*d*) illustrates group spread normally occasioned by passengers walking forward along the high speed section, which should not occur if the red/green handrail structure is employed. Should this occur, the forwardmost passengers will be detected earlier than expected and the entire system will be slowed down to permit the entire group to move onto the deceleration section.

The computer employed is a conventional digital computer as are all the computer related components involved.

Inputs from the walkway to the computer system are analog and digital. The digital information arrives at the computer and is processed directly. The digital information will include whether the turnstile 150 is operative or not, whether the rotating arms 152 are operative or not, whether the power to the walkway is "on". The digital information is conventionally received through input cards (not shown).

The computer, in addition to processing digital inputs, must also process motor speed information. Since this information is in analog form, conventional analog-to-digital converters are provided.

Computer output is either digital and therefore direct, or digital requiring conversion to analog. A digital-to-analog converter (not shown) is provided to effect the conversion.

The computer controls and meters the speed of the walkway, its direction of travel, acceleration, deceleration, turnstiles, rotating arms, and sensors 160, 164.

In a typical cycle, the computer, prior to the placing of passengers onto the walkway, will activate a green light (not shown) and activate turnstile 150. Passengers will be permitted to enter the acceleration section which at that moment is stationary. Several seconds prior to the initiation of acceleration, the computer will switch off the green light and, if desired, may switch on a warning signal, such as a conventional flashing red light (not shown).

At the end of the selected loading period (about 15 to 20 seconds is deemed adequate) the computer will activate a conventional switching circuit to lock the turnstile 150 against further passenger entry onto the acceleration treadway.

At this point in time, the computer will, through conventional switching circuitry, open rotating arms 152, activate the power source and begin to supply power to the rollers which constitute the acceleration section. Speed is monitored by the computer and controlled through conventional electronic circuitry (not shown).

The speed of the high speed conveyance section is also monitored and controlled by the computer. The speed of this section is maintained constant unless the passengers have walked forward. Should this occur, the computer will sense this fact through the early activation of sensor 160 by the first to arrive passenger. The computer will then slow down the entire walkway to allow the stretched out group of passengers to enter the deceleration section as a group. Additionally, the acceleration section will be permitted to accelerate to a lower top speed consonant with the reduced speed of the high speed section. The system will not be permitted to resume normal operational speeds unless and until the computer has determined that it is safe to do so, generally after the expanded group has left the system.

The walkway described in this embodiment benefits from the use of hydraulic systems to supply power to the rollers, although variable speed electric motors may also be employed.

The deceleration section is structurally identical to the acceleration section and accordingly, no further explanation or description is presented.

Additionally, it is apparent from the foregoing that all rollers in the acceleration section are accelerated simultaneously. Passenger spacing does not change during acceleration, nor does it change during deceleration when the same conditions prevail. Accordingly, "bunching" of passengers in the deceleration section is not a problem as it is with existing prototype units.

As in the first embodiment, the handrail unit employed should be capable of accelerating and decelerating with the passenger. FIGS. 11 and 12 illustrate the handrail drive used with the second embodiment.

The handrail 224 is driven by the hydraulic motors 202 through pulleys 226 and 228 via turning belt 230. Pulley 226 can be mounted to any one of shafts 218 to supply the needed driving force.

Since the walkway rollers in each section accelerate and decelerate as a group, it is only necessary to have the handrail move conjointly with the rollers. Conventional handrail designs of the type used with constant speed walkways or escalators will be adequate. As shown, the handrail comprises an endless belt 232 which wraps about pulleys 234 and 236. Pulleys 236 are mounted on shaft 240 which in turn is rotatably mounted to the sidewalls of the walkway via bearings 242. Pulleys 236 are idler pulleys used to support and guide belt 232. Pulleys 234 are driven, as described above, and supply the motive power for the handrail. As can be seen, any increase or decrease in motor output speed will translate into a corresponding increase or decrease in the speed of the handrail.

As shown in FIG. 11, the handrail is not continuous over the entire system. Rather, each section—acceleration, high speed, deceleration—has its own handrail segment. To insure that the passenger lifts his hand from the handrail as he moves from one section to the other, the balustrade or sidewalls 244, 246 are formed upwardly into a projecting surface 248 designed to force one to release his grip on the handrail and to carry the hand over to the handrail in the next section.

The systems described herein employ rollers on which the passenger stands. Of desired, a continuous treadway can be used to cover the high speed rollers in the first and second embodiments if desired. A treadway of this type may also be used to cover the rollers in the acceleration and deceleration sections of the second embodiment since these rollers all accelerate, or decelerate, in unison.

Many modifications may be made in addition to the above-described embodiments. It is intended to cover all such modifications which fall within the spirit and scope of the invention as defined by the claims appended hereto.

What I claim is:

1. A variable speed walkway comprising an acceleration section, a high speed section and a deceleration section, each of said sections comprising a plurality of rollers, each of said rollers in at least the acceleration and deceleration sections having a pulley thereon; a prime mover for each of said sections having an output shaft with a pulley thereon, means for individually and selectively varying the output speed of each of said prime movers; timing belt means in at least said acceleration and deceleration sections drivingly connected between the output shaft pulley and the pulleys of a selected number of said rollers in each of said sections; means for permitting passengers to enter said acceleration section, the rollers in said acceleration section being at rest during the passenger boarding operation, means for normally preventing passengers from entering said high speed section during passenger loading of said acceleration section and means for activating the prime movers in said acceleration section to accelerate passengers to the speed of said high speed section; sensor means adjacent the junction of said high speed section and said deceleration sections for sensing the arrival of a passenger at said deceleration section, and means for decelerating the rollers in said deceleration section to a selected exit speed beginning a selected time after the passenger is sensed by the sensor.

2. The variable speed walkway according to claim 1 wherein said means for activating the prime movers in the acceleration section and for decelerating the rollers in the said deceleration section comprises a computer.

3. The variable speed walkway according to claim 2 in which the means for permitting passengers to enter said acceleration section comprises a turnstile at the entrance to the walkway, said turnstile being rotatable to allow passengers to enter the walkway acceleration section when said acceleration section is at rest, for counting the number of people entering the acceleration section and for measuring elapsed time to lock said turnstile after a selected number of passengers have entered or after a selected time period has elapsed.

4. The variable speed walkway according to claim 3 in which the means for normally preventing passengers from entering said high-speed section comprises blocking means adjacent the junction between the high speed section and the acceleration section for normally preventing passenger entry to the high speed section, and switch means controlled by said computer for activating said blocking means to permit passengers to enter the high speed section when the turnstile is locked.

5. The variable speed walkway according to claim 4 further comprising a handrail in each of said sections, said handrail comprising a belt and a plurality of pulleys for supporting and moving said belt along the walkway, at least one prime mover for moving said belt having at least one output pulley for said belt, at least one of the pulleys for supporting said belt having a driven pulley thereon, and timing belt means connecting the output pulley for said belt and the driven pulley for moving the belt along the walkway at the same speed at which the rollers are being driven.

6. The variable speed walkway according to claim 1 wherein said prime movers comprise hydraulic motors and in which the means for varying the output speed of said prime movers comprise a variable volume pump for controlling said hydraulic motor and a servo controller for controlling said variable volume pump, means for measuring the speed of said walkway and computer means for comparing the instantaneous speed of said walkway to a selected instantaneous speed, said servo controller responding to difference in the detected speed and the selected speed to increase or decrease the speed of the walkway rollers to the selected speed.

7. A variable speed handrail assembly adapted for use with a variable speed walkway, said handrail system comprising a plurality of blocks for a passenger to grasp, a plurality of friction blocks, means connecting each of said first blocks to a separate friction block, each of said friction blocks having a shaft extending therethrough, track means spaced apart on either side of said friction blocks, bearings on the end of each shaft engaging said track means, a plurality of rotatable means frictionally engaging said friction blocks and spaced along the path of said handrail for causing said friction blocks to move along said track means, a sheave mounted on each of said rotatable means, a prime mover having an output shaft and output sheave thereon and driving the sheaves on said rotatable means, belts drivingly connecting said output sheave and the sheaves connected to said rotatable means, the pitch diameters of the output sheave and the individual sheaves connected to said rotatable means being sized to move each friction block at the walkway speed at the location of said rotatable means.

8. A variable speed walkway system comprising an acceleration section, a following high-speed section and a following deceleration section, a walkway surface for each section, each such walkway surface comprising a plurality of closely spaced transversely mounted rollers, a prime mover for each section, individual drive means for each of said rollers connecting the prime mover of each section to the respective rollers thereof for accelerating the walking surface of the accelerating section, maintaining the speed of the walkway surface of the high-speed section, and decelerating the speed of the walkway surface of the decelerating section, in combination with a variable speed handrail assembly for each walkway section, said handrail assembly comprising a plurality of blocks for the passenger to grasp, a plurality of friction blocks and means for connecting each block to a separate friction block, each said friction block having a shaft extending therethrough, said handrail assembly having spaced apart track means, bearings on the ends of each said shaft for engaging said track means, rotatable means for frictionally engaging said friction block spaced along said walkway for causing said block to move along said track means, sheave means mounted on each said rotatable means, at least one prime mover having an output shaft and an output sheave thereon for driving the sheave on said rotatable means, and a polyurethane belt drivingly mounted on the said output sheave and on a sheave connected to one of said rotatable means, the pitch diameters of the output sheave and the sheave connected to the rotatable means driven by the said output sheave being sized to move a friction block at the walkway speed at the location of the said rotatable means.

9. The variable speed walkway according to claim 8 further comprising a sheave on each of said rotatable means, polyurethane belts mounted on the sheaves of adjacent rotatable means to transfer driving power from one rotatable means to the next adjacent rotatable means along a selected number of rotatable means, the pitch diameters of the sheaves on each of the rotatable means being selected to move the friction block along at the instantaneous speed of the walkway at the location of the rotatable means.

10. The variable speed walkway according to claim 8 wherein said track means extends along the length of each section of the walkway and returns adjacent the walkway roller surface, a plurality of return idler rollers located along the return pathway, at least one driven roller for engaging the said friction block of at least one block to move said block along said return path, and means for drivingly connecting said drive roller to said prime mover.

11. The variable speed walkway according to claim 10 wherein said blocks, when on the return path, are in contact with each other.

* * * * *